United States Patent
Czaplewski et al.

(10) Patent No.: US 9,404,004 B2
(45) Date of Patent: Aug. 2, 2016

(54) HIGH PERFORMANCE HOTMELT WINDOW SEALANT

(71) Applicants: Patrick John Czaplewski, New Berlin, WI (US); David P. Keuler, New Berlin, WI (US); Michael D. Vitrano, West Allis, WI (US)

(72) Inventors: Patrick John Czaplewski, New Berlin, WI (US); David P. Keuler, New Berlin, WI (US); Michael D. Vitrano, West Allis, WI (US)

(73) Assignee: BOSTIK, INC., Wauwatosa, WI (US)

( * ) Notice: Subject to any disclaimer, the term of this patent is extended or adjusted under 35 U.S.C. 154(b) by 132 days.

(21) Appl. No.: 13/694,728

(22) Filed: Dec. 28, 2012

(65) Prior Publication Data

US 2014/0187695 A1 Jul. 3, 2014
US 2016/0177119 A9 Jun. 23, 2016

(51) Int. Cl.
*C08K 3/26* (2006.01)
*C08K 5/00* (2006.01)
*C09D 123/02* (2006.01)
*C09J 123/14* (2006.01)
*C09J 153/02* (2006.01)

(52) U.S. Cl.
CPC ............ *C09D 123/02* (2013.01); *C09J 123/14* (2013.01); *C09J 153/02* (2013.01)

(58) Field of Classification Search
USPC ........................................................ 524/425
See application file for complete search history.

(56) References Cited

U.S. PATENT DOCUMENTS

| | | | |
|---|---|---|---|
| 8,481,634 B2 * | 7/2013 | Wang et al. | 524/502 |
| 2007/0282072 A1 * | 12/2007 | Hoffmann et al. | 525/240 |
| 2010/0004367 A1 | 1/2010 | Yano et al. | |
| 2011/0021103 A1 * | 1/2011 | Alper et al. | 442/329 |

FOREIGN PATENT DOCUMENTS

| | | |
|---|---|---|
| EP | 1462500 A1 | 9/2004 |
| EP | 2431417 A1 | 3/2012 |
| WO | WO 2004085565 A1 * | 10/2004 |

OTHER PUBLICATIONS

International Search Report mailed Jun. 12, 2013 in corresponding PCT International Application No. PCT/US2012/000590.
Written Opinion of the International Searching Authority mailed Jun. 12, 2013 in corresponding PCT International Application No. PCT/US2012/000590.
International Preliminary Report on Patentability mailed Jul. 10, 2014 in corresponding PCT International Application No. PCT/US2012/000590.

* cited by examiner

*Primary Examiner* — Hui Chin
(74) *Attorney, Agent, or Firm* — Wozny Law, LLC; Thomas M. Wozny

(57) ABSTRACT

A hot applied, non-crosslinking, non-butyl, sealant. These sealants are composed of olefin polymers, styrenic block copolymers, an ethylene vinyl acetate copolymer, tackifying resins, plasticizers, and preferably inorganic fillers, and organosilane adhesion promoters. Optionally, the sealant may include UV absorbers, antioxidants, pigments, and the like. The sealants are suitable for use as edge sealants for insulated glass (IG) window units.

14 Claims, No Drawings

HIGH PERFORMANCE HOTMELT WINDOW SEALANT

BACKGROUND OF THE INVENTION

Many types of hot applied glass sealants are currently used in the insulated glass sealant market. One type is a two-component chemically-cured sealant. Another type is a single-component curing sealant. Another type is a non-curing hot melt, butyl rubber based sealant. The present invention is directed towards an improved high performance, non curing, hot melt, window sealant that does not require butyl polymer. This novel sealant is suitable for use as an edge sealant for the manufacture of insulated glass structures.

Two-component sealants irreversibly cure to form solid thermoset elastomeric sealants. In using these sealants, both the ratio of components and their mixing are important and must be precise. If there is any error in the ratio of the components, or if improper mixing occurs, the sealant will not cure properly and/or will not adequately chemically adhere to a substrate. The reaction is irreversible and cannot be terminated. This creates problems if the reaction occurs too slowly or too rapidly while the sealant is being applied or if curing occurs during potential equipment shutdowns. As such, application equipment must be thoroughly purged of mixed sealant or the sealant will cure in the equipment. Purging wastes materials and time, thus adding costs to the final product. Further, if the sealant has not properly cured it does not have the mechanical properties to sufficiently hold the window together. Any premature handling or movement of the window causes premature cohesive failure of the sealant, and/or sealant-to-substrate bond delamination. Also, slow curing of the sealant requires that the window manufacturing facilities have staging areas to allow the sealant to properly cure. This lost time and space results in higher costs.

Single-component curing sealants only slightly reduce the need for post application cure time staging areas and have essentially all of the similar application concerns of the two component materials. The exception for single component cure systems is that the ratio and mixing limitations take place at the sealant manufacturing location rather than at the window manufacturing location. The net effect is that a complication in assuring a finite and effective window seal is achieved. Single-component curing sealants also rely upon a water vapor cure mechanism which requires an effective packaging system to prevent the inclusion of atmospheric moisture. Such packaging is often ineffective and results in inferior product performance due to post application cure.

Butyl rubber-based sealants have none of the cure associated application liabilities. They offer uncomplicated application parameters along with the elimination of cure time window handling requirements. Although somewhat inferior to cross linking systems, industry testing has shown butyl sealants to perform reliably at considerable cost advantage. They have historically shown utility in the competitively priced residential window category. However, butyl polymers have routinely been associated with supply concerns as the raw material feed stocks used to produce the butyl are increasingly directed towards the manufacture of other higher value polymeric materials. As such, butyl rubber manufacture is often constrained and subjected to extreme pricing fluctuations based upon the supply and demand curve. Universally employed in the manufacture of hot applied non curing window sealants, butyl rubber supply has the very real potential to produce a situation whereby an entire product class of non curing window sealants risks being priced out of the marketplace. Such an occurrence will render many window producers within the insulated glass window marketplace without adequate sealant supply.

A new class of non crosslinking hot melt window sealants has now been developed. Prior to the arrival of these newly formulated materials, butyl rubber has defined the non curing window sealant marketplace. Butyl rubber has de facto been required to manufacture a hot melt product intended for use as a sealant for insulated glass window manufacture without otherwise employing a post application cure mechanism. Removal of the butyl rubber from these systems effectively eliminates the associated supply concerns and provides an entirely new design space for formulation of insulated window glass sealant products. These new materials have been formulated to completely eliminate the butyl rubber polymer component, while improving upon resultant insulated glass window sealant performance. The materials have been certified to comply with industry recognized ASTM test methods; E 2188, E2189, and E2190, collectively referred to as HIGS or Harmonized Insulated Glass Standards.

SUMMARY OF THE INVENTION

The present invention provides for hot applied non-cross linking, non-butyl containing sealants which are applied as an edge sealant for insulating glass (IG) units for the purpose of bonding the components of IG units together and sealing the units from moisture and gas penetration.

The sealants are comprised of about 2% to 50% by weight of a metallocene catalyzed polyolefin polymer, about 5% to 50% by weight of a Ziegler-Natta catalyzed amorphous poly alpha olefin (APAO) polymer, about 2% to 25% by weight of an elastomeric A-B-A type styrenic block copolymer, about 2% to 25% by weight of a non-metallocene catalyzed ethylene based copolymer, about 10% to 50% by weight of a tackifying resin, and about 5% to 25% by weight of a plasticizer. Optionally, the sealant may also include an ultraviolet (UV) light stabilizer, inorganic mineral filler, pigment, an elastomeric A-B type styrenic block copolymer, an organosilane adhesion promoter, and an antioxidant, as well as other common additives provided they do not substantially interfere with the performance of the sealant.

The sealants are designed to be formulated without the incorporation of butyl rubber polymers though alternatively they may contain small incremental percentages of butyl rubber compounds, i.e. 0% to 10% by weight and preferably 0% to 5% by weight of butyl rubber.

The formulations provide superior or equivalent adhesion characteristics, peel and shear performance, resistance to application flow, set speed, fogging characteristics, and Moisture Vapor Transmission Rate (MVTR) performance over traditional butyl based hot applied insulating glass edge sealants.

Rheological analysis of the novel formulations described herein show an extension of the service temperature performance range when compared to butyl based sealants. They demonstrate improved cold temperature flexibility over butyl containing formulations via a significantly lowered glass transition temperature (Tg). The formulations also demonstrate an improvement in elevated temperature resistance over butyl containing formulations via an increase in storage modulus (G') throughout the upper service temperature range extending from 60° C. to 80° C.

Performance Evaluation

The sealants disclosed herein have been certified to comply with industry recognized ASTM test methods; E 2188, E2189, and E2190, collectively referred to as HIGS or Harmonized Insulated Glass Standards; detailed in the table below.

| Harmonized IG Standards Comparison | | | |
|---|---|---|---|
| | US Standards ASTM E 773, E 1887, E 774 | Canadian Standards CAN/CGSB 12.8 | Harmonized Standards ASTM E 2188, E 2189, E 2190 |
| High Humidity Test | | | |
| Max temp. | 60 +/− 3 C. | 55 +/− 3 C. | 60 +/− 3 C. |
| Min. temp. | (constant temperature) | 22 +/− 3 C. | (constant temperature) |
| % RH | 95% +/− 5% | constant water mist | 95% +/− 5% |
| total time | 42 days* | 28 days** | 42 days (14 days + 28 days)* |
| Accel. Weather Cycle test | | | |
| high temp | 57 +/− 3 C. | 50 +/− 3 C. | 60 +/− 3 C. |
| low temp | −30 +/− 3 C. | −32 +/− 3 C. | −29 +/− 3 C. |
| UV source | F72T12BL/HO | none | F72T12BL/HO |
| UV output | 10 W/m$^2$ | n/a | 10 W/m$^2$ |
| moisture | 30 min. spray | 5 min. spray | 30 min. spray |
| time per cycle | 6 hr. | 4 hr. | 6 hr. |
| # of cycles | 252.00 | 320.00 | 252.00 |
| total time | 63 days | 53.3 days | 63 days |
| Volatile Fog Test | | | |
| type | corner UV exposure | full immersion box | full immersion box |
| glass temp at corner | 65 C. +/− 3 C. (at corner only) | 60 +/− 3 C. | 50 +/− 3 C. |
| glass temp other locations | 24 C. min. | 60 +/− 3 C. (full Immersion) | 50 +/− 3 C. |
| cooling plate temp | 21 +/− 3 C. | 22 +/− 3 C. | 21 +/− 3 C. |
| cooling plate area | 0.016 m$^2$ (127 × 127 mm) | 0.018 m$^2$ (150 mm dia) | 0.018 m$^2$ (150 mm dia) |
| UV lamp | Osram Ultra Vitalux 300 w | Osram Ultra Vitalux 300 w | Osram Ultra Vitalux 300 w |
| lamp output | 2.0 μW/cm$^2$ @ glass surface [2000 μW/cm$^2$] | 0.4 μW/cm$^2$ @ 300 nm [400 μW/cm$^2$] | 400 μW/cm$^2$ @ 355 nm |
| Specimens | | | |
| width | 356 +/− 6 mm | 350 +/− 5 mm | 355 +/− 6 mm |
| height | 508 +/− 6 mm | 500 +/− 5 mm | 505 +/− 6 mm |
| Number for weathering | 6.00 | 4.00 | 6.00 |
| Number for high humidity | uses same 6 as weathering | 8 (different for weathering) | uses same 6 as weathering |
| Number for fog | 2.00 | 2.00 | 2.00 |
| Evaluation criteria | | | |
| Frost point test | E546 w/ dry Ice | brass cup w/ dry ice &alcohol | E546 w/ dry Ice or CGSB 12.8 method |
| max. frost point | −29 C. | −40 C. | −40 C. |
| visible fog | no fog at arms' length | no fog at 2 m normal to view box | no fog at arms' length |
| Optional CAN/CGSB | | | |
| 12.8 tests: | Initial Seal Test (optional) | argon concentration | water immersion test (argon) |

*Both E 774 and E 2190 use same units In both the accelerated weathering and high humidity
**CAN 12.8 uses separate samples for accelerated weathering and high humidity

DESCRIPTION OF THE INVENTION

It has been discovered that a combination of a polyolefin polymer based on metallocene catalyst technology, a APAO polyolefin polymer based on Ziegler-Natta catalyst technology, an A-B-A type styrenic block copolymer, a non-metallocene catalyzed ethylene based copolymer, a tackifier, and a plasticizer can be incorporated into hot melt formulas that will exhibit adhesion characteristics necessary to bond insulated glass window components as well as sealant characteristics necessary for sealing such IG units from moisture and gas penetration.

Hot melt sealants are commonly used today for IG window construction, and in particular the hot melts are generally based on butyl rubber, which is a copolymer of isobutylene and isoprene. They can also be based on a pure polyisobutylene polymer, which is commonly referred to as PIB. The compositions of this invention are advantageous in that they are non-butyl rubber containing thermoplastic sealants having excellent creep and/or sag properties, are easily applied, have excellent moisture vapor transmission rates, good adhesion and tensile properties, and minimum surface tack at room temperature. A typical composition has a water vapor transmission rate (ASTM F-1249) of less than about 0.1 g/(100 in$^2$ per 24 hours), and when applied to window glass panels produces an initial peel value of greater than 25 lbs./in. at room temperature, and a 120° F./500 gram static load shear value measured in excess of 60 minutes.

The insulated glass window units using these sealants comprise two panes maintained in a parallel, spaced-apart relationship by one or more spacer bars, thus forming a cavity between the panes. A primary sealant is present between each spacer bar and each pane, adjacent to the cavity. A secondary sealant may also be present between each pane and each spacer bar, not adjacent to the cavity. The sealant composition of this invention can be either or both the primary and secondary sealants although it is typically the primary sealant. Primary sealants are single seal constructions involving the application of only one type of sealant to all three sides of the spacer. The cavity between the panes is filled with an insulating gas or gases such as air, carbon dioxide, sulfur hexafluoride, nitrogen, argon, krypton, xenon, and the like. A glazing bead is typically positioned between the panes and the window frame. The panes can be fabricated from any of a variety of materials such as glass, e.g., clear float glass, annealed glass, tempered glass, solar glass, tinted glass and low energy glass, acrylic resin, polycarbonate resin and the like.

The sealants may be applied to the spacers using either, hand gunning, automated extrusion, or automated three sided extrusion. A desiccant composition or hot melt matrix, which acts to absorb atmospheric moisture, is typically used in conjunction with the sealant compound and is first applied to or otherwise incorporated into the interior of the spacer construction. In the hand gun application method, previously staged spacers and glass panels are employed. The panels of glass are then bonded to the spacer, which requires that the sealant be dispensed manually from bulk dispensers by use of a hand gun. The sealant may be similarly dispensed robotically or via other mechanical automation techniques. A three side extrusion method may also be used whereby the sealant is applied to both of the sides and the outer surface of the spacer, which is then positioned between two glass panels creating the insulating glass assembly. Once the assembly is made, the composite is compressed by either a heated or a non-heated roller press. With a heated roller the surface temperature of the glass is typically heated to between about 60° C. and 90° C. and sealed with pressure until the unit is a set thickness. The unit is then cooled to room temperature. The combination of heat and compression is used to achieve the proper adhesion and the desired unit thickness. If a vent hole has been used to reduce the internal pressure of the unit during the sealing process, this hole is then sealed with said sealant.

The composition of the present invention includes about 2% to 50% by weight of a polyolefin polymer which is made by metallocene catalyzed polymerization. Preferably the composition includes about 5% to 40% by weight, and most preferably about 9% to 30% by weight of the metallocene catalyzed polyolefin polymer. The metallocene catalyzed polyolefin polymer functions to provide the formulation the cohesive strength and heat resistance necessary to resist sag at temperatures up to 60-80° C. that can be expected for a window exposed to the sun during summer. It does this by providing a substantially linear storage modulus (G') throughout the service temperature range of from 0° C. to 80° C. The metallocene catalyst technology polyolefin polymers useful in the present invention are elastomeric polymers within a larger group of olefins. Olefins are unsaturated hydrocarbons and the most typical monomers used in polyolefins are ethylene and alpha-olefins containing up to ten carbon atoms. Principal olefin monomers include ethylene, propylene, butene-1,4-methylpentene, hexene, octene and combinations thereof. Polyolefins include ethylene polymers, propylene polymers, and combinations thereof including combinations with other $C_4$-$C_{10}$ alpha-olefins. Elastomeric polyolefins typically contain ethylene and propylene, and may contain other $C_4$-$C_{10}$ olefin monomer units. Some particularly preferred polyolefin polymers are copolymers of ethylene with at least one other olefin monomer, referred to as "ethylene-based" because the predominant monomer is ethylene such as ethylene-propylene copolymers and ethylene-octene copolymers, or copolymers of propylene and at least one other olefin monomer, referred to as "propylene based" because the predominant monomer is propylene, such as propylene-ethylene copolymers. Although any polymer falling in the range of properties herein described above can be used, preferred polyolefin polymers useful in this invention are available from Dow Chemical Co. under the trade name designation Engage or Versify, and from ExxonMobil Chemical under the trade name designation Vistamaxx, among others.

The composition of the present invention also includes about 5% to 50% by weight of an amorphous poly-alpha-olefin (APAO) polyolefin polymer which is made by Ziegler-Natta catalyzed polymerization. Preferably the composition includes about 8% to 40% by weight, and most preferably about 12% to 30% by weight of the APAO polymer. The APAO polymer functions to provide the formulation cohesive strength and heat resistance. The APAO polymer has a Brookfield viscosity at 190° C. of between 1,000 and 50,000 centipoise (cP) as per ASTM D-3236. The Ziegler-Natta catalyst technology APAO polyolefin polymer component useful in the present invention consists of several different categories of atactic, low molecular weight, low melt viscosity, and substantially amorphous propylene based polymers. The term "substantially amorphous" is defined herein as having a degree of crystallinity less than 30%, as determined by differential scanning calorimetry against a highly crystalline polypropylene standard. These polymers can be either homopolymers of propylene or copolymers of propylene with one or more α-olefin comonomer, such as for example, ethylene, butene-1, hexene-1 and octene-1. The average weight molecular weight of the polymers in the scope of the present invention is in the range of from about 4,000 to about 150,000 g/mol, preferably from about 10,000 to about 100,000 g/mol. The said polymers have a Ring and Ball softening point between about 80° C. and 190° C. as determined by ASTM E-28, and a glass transition temperature from about −5 to −40° C. as determined by ASTM D-3418. Although any APAO polymer falling in the range of physical properties herein described above can be used, the most preferred APAO is selected from the group consisting of propylene homopolymer, propylene-ethylene copolymer, propylene-butene-1 copolymer and propylene-ethylene-butene-1 terpolymer. Suitable APAO polymers useful in this invention of the types herein described above are commercially available from Eastman Chemical Company of Kingsport, Tenn., under the trade name designation Eastoflex, or from Evonik Industries, under the trade name designation Vestoplast or from Rextac LLC, under the trade name designation RT, among others.

The composition of the present invention further includes about 2% to 25% by weight of an A-B-A type styrenic block copolymer. Preferably the composition includes about 5% to 20% by weight, more preferably about 8% to 20% by weight, and most preferably about 9%-15% by weight of the A-B-A type styrenic block copolymer. The A-B-A type styrenic block copolymer functions to provide low temperature flexibility. The A-B-A type styrenic block copolymer component useful in the present invention may be selected from a variety of A-B-A block copolymers. In the block copolymer, the A block is a non-elastomeric block comprised of a poly(vinyl aromatic monomer) such as styrene. In the block copolymer, the B block is an elastomeric block component which is preferably at least partially and most preferably at least substantially hydrogenated. The B blocks include but are not limited to polybutadiene, poly(ethylene-butylene), polyisoprene, poly(ethylene/propylene), etc. The A-B-A type styrenic block copolymer may include a graft moiety selected from the group consisting of ethylenically unsaturated carboxylic acids, ethylenically unsaturated carboxylic acid anhydrides, and derivatives thereof. The block copolymers useful herein include aromatic and aliphatic block copolymers such as styrene-isoprene-styrene (SIS), styrene-butadiene-styrene (SBS), styrene-ethylene-butylene-styrene (SEBS), styrene-ethylene-propylene-styrene (SEPS), styrene-ethylene-ethylene-propylene-styrene (SEEPS), styrene-isoprene-butadiene-styrene (SIBS), styrene-ethylene-butylene (SEB), and styrene-ethylene-propylene (SEP) block copolymers, having a styrene content of from about 15% to about 50% by weight in the copolymer. Suitable A-B-A polymers useful in this invention of the types herein described above are commercially available from Kraton Polymers LLC under the trade name designation Kraton and from Kuraray Co LTD under the trade name designation Septon, among others.

The composition of the present invention optionally may also include about 0% to 25% by weight of an A-B type styrenic block copolymer. If included, the composition preferably includes about 2% to 20%, more preferably about 5% to 20%, and most preferably about 9% to 15% by weight of the A-B type styrenic block copolymer. The A-B styrenic block copolymer functions to provide low temperature flexibility. The A-B type styrenic block copolymer component useful in the present invention may be selected from a variety of A-B diblock copolymers. Diblock copolymer rubbers are copolymers of A-B type wherein A represents a non-elastomeric block comprised of a poly(vinyl aromatic monomer) such as styrene and the B blocks include but are not limited to polybutadiene, poly(ethylene-butylene), polyisoprene, poly(ethylene/propylene), etc. Diblock copolymer rubbers are made by polymerizing one of the monomers to essential completion and then adding the second monomer. Thus, butadiene may be anionically polymerized using sec-butyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Suitable A-B polymers useful in this invention of the types herein described above are styrene-butadiene (SB) and styrene-isoprene (SI) block copolymers which are commercially available from Total Petrochemicals under the trade name Finaprene, and from Dynasol under the trade name Solprene, among others.

The composition of the present invention also includes about 2% to 25% by weight of an ethylene based copolymer that is not metallocene catalyzed. Preferably, the composition includes about 3% to 20% by weight, more preferably about 4% to 20% by weight, and most preferably about 5% to 15% by weight of the non-metallocene ethylene copolymer. The non-metallocene ethylene copolymer functions to provide low temperature flexibility due to its low glass transition temperature (Tg). The non-metallocene ethylene copolymer component useful in the present invention may be selected from any of the copolymers and terpolymers of ethylene. Examples of ethylene copolymers include ethylene vinyl acetate, ethylene methyl acrylate, ethylene ethyl acrylate, ethylene n-butyl acrylate, ethylene acrylic acid, ethylene methacrylate, ethylene methyl-methacrylate, ethylene 2-ethylhexyl acrylate, and combinations thereof. Useful ethylene vinyl acetate copolymers exhibit a melt index of less than 400 g/10 min. Suitable non metallocene ethylene based copolymers also include a vinyl acetate content of at least 14% by weight to about 50% by weight. Suitable ethylene vinyl acetate copolymers useful in this invention of the types herein described above are commercially available from AT Plastics under the trade name ATEVA, among others.

The composition of the present invention also includes about 10% to 50% by weight tackifier. Preferably, the composition includes about 12% to 40%, more preferably about 15% to 35%. Tackifiers are used in the composition to improve specific adhesion, and should be chosen to minimize the release of volatile organic compounds (VOC) which could accumulate in the closed air space of an IG unit and condense on the glass to form fog. The tackifier component useful in the present invention may be selected from any of the rosin derivatives including wood rosins, tall oil and derivatives thereof, rosin ester resins, natural and synthetic terpene resins and also aliphatic, aromatic or mixed aliphatic-aromatic hydrocarbon resins. Further tackifier components having aromatic constituents can be prepared from monomers which each have an aromatic group and a polymerizable, unsaturated group. Suitable monomers are, for example, styrene, α-methylstyrene, vinyltoluene, methoxystyrene, tert-butylstyrene, chlorostyrene, indene monomers including methylindene and others. Aliphatic monomers are usually natural and synthetic terpenes which contain $C_5$ or $C_6$ cyclopentyl or cyclohexyl groups and have a series of aromatic, cyclic substituents. Further monomers for these tackifiers are 1,3-butadiene, cis-1,3-pentadiene, trans-1,3-pentadiene, 2-methyl-1,3-butadiene, 2-methyl-2-butene, cyclopentadiene, dicyclopentadiene, terpene, terpene-phenol resins and others. Further tackifier components which can be used are coumarone-indene resin, phenolic resins, p-tert-butylphenol-acetylene resins, phenol-formaldehyde resins, xylene-formaldehyde resins, oligomers of monoolefins or diolefins, aromatic or cycloaliphatic hydrocarbon resins, hydrogenated hydrocarbon resins, hydrocarbon resins, hydrogenated wood rosins, hydrogenated oil resins and their esters with monofunctional or polyfunctional alcohols. One skilled in the art would recognize that this is a representative rather than an exclusive list. Preference is given to the hydrogenated hydrocarbon resins with suitable hydrogenated hydrocarbon resins useful in this invention of the types herein described above being commercially available from ExxonMobil Chemical, under the trade name Escorez, as well as from Eastman Chemical Co., under the trade name Eastotac, among others.

A plasticizer is present in the composition of the present invention in amounts of from about 5% to 25% by weight. Preferably the composition includes about 8% to 20%, more preferably about 8% to 15%, and most preferably about 10% to 15% by weight of the plasticizer. The plasticizer component useful in the present invention may be selected from any of the mineral based oils, petroleum based oils, liquid resins, liquid elastomers, polybutene, polyisobutylene, phthalate and benzoate plasticizers, and epoxidized soya oil. A plasticizer is broadly defined as a typically organic composition that can be added to the thermoplastic rubbers and other resins to improve extrudability, flexibility, workability and stretchability in the finished sealant. Any material which flows at ambient or application temperatures and is compatible in the compositions of the present invention may be useful. Preferably, the plasticizer has low volatility at temperatures of greater than about 40° C., and thus preferably have a flash point higher than 180° C., and most preferably higher than 200° C. The most commonly used plasticizers are oils which are primarily hydrocarbon oils, low in aromatic content and are paraffinic or naphthenic in character. The oils are preferably low in volatility, transparent and have as little color and odor as possible.

This invention also contemplates the use of olefin oligomers, low molecular weight polymers, vegetable oils and their derivatives and similar plasticizing oils. Preference is given to the petroleum based oils with suitable paraffinic minerals oils useful in this invention of the types herein described above are commercially available from Sonneborn, Inc., under the trade name Hydrobrite, and polybutene available from Ineos under the tradename Indopol.

Inorganic filler is optionally present in the composition in amounts of from about 0% to 75% by weight. Preferably the composition includes about 10% to 70%, more preferably about 15% to 60%, and most preferably more about 20% to 50% by weight of the inorganic filler. Inorganic fillers provide reinforcement and cohesive strength to the composition. The inorganic filler component useful in the present invention may be selected from any refined or processed material obtained as a result of the mining of minerals including talcs, clays, silicas, micas, limestones, marbles, and chalks. Of the various minerals listed preference is given to the calcium carbonates having been processed from calcite, which naturally occurs in limestones, marbles, and chalks. Particularly useful in this invention of the types herein described above are commercially available from Imerys Performance minerals, especially calcium carbonate under the trade name Camel-Wite.

The composition may optionally also include about 0% to 5% by weight of an organosilane adhesion promoter. Preferably the composition includes about 0.1% to 4%, more preferably about 0.2% to 3%, and most preferably about 0.4% to 2% by weight of the organosilane adhesion promoter. These compounds function to increase adhesion to substrates such as glass and metal found in IG units. Silane adhesion promoters may optionally be added to the composition of the present invention. Preferably epoxy-functional silane compounds which are available from Degussa under the trade name Dynasylan Glymo, and from Momentive Performance Materials under the trade name Silquest.

The composition may include an antioxidant stabilizer in an amount from about 0% to 5% by weight. Preferably from about 0.1% to 2% by weight of an antioxidant stabilizer is incorporated into the composition. A stabilizer or antioxidant can also be added to protect the composition from degradation caused by reaction with oxygen induced by such things as heat, light or residual catalyst from the raw materials such as the tackifying resin. Such antioxidants are commercially available from BASF and include Irganox 565, Irganox 1010 and Irganox 1076, all hindered phenolic antioxidants. These are primary antioxidants which act as free radical scavengers and may be used alone or in combination with other antioxidants such as phosphite antioxidants like Irgafos 168 available from BASF. Phosphite antioxidants are considered secondary antioxidants, are primarily used as peroxide decomposers and are generally not used alone, but are instead used in combination with other antioxidants. Other available antioxidants are Cyanox LTDP, a thioether antioxidant, available from Cytec Industries, Ethanox 330, a hindered phenolic antioxidant, available from Albemarle, and Naugard 445, a solid aromatic amine antioxidant, available from Chemturea. Many other antioxidants are available for use by themselves, or in combination with other antioxidants. These compounds are added to the sealants in small amounts, up to about 2% by weight in the composition and have no effect on the physical properties of the adhesive.

Other compounds that also could be added that have negligible effects on the physical properties are pigments which add color such as carbon black and titanium dioxide, fluorescing agents, weatherability improvers such as ultraviolet (UV) absorbers like Tinuvin™ P, 327 and 328 and UV scavengers such as Tinuvin™ 770 from Ciba-Geigy, and odor masks to mention only a few. Additives such as these are known to one of skill in the art. UV stabilizers are typically incorporated in amounts of from about 0% to 3% by weight, and preferably about 0.1% to 2% by weight. Other additives, such as pigments, may be incorporated in amounts of about 0% to 10% by weight, and preferably about 0.1% to 5% by weight.

A butyl rubber polymeric component may also be incorporated into said sealant at an incremental percentage level of about 0% to 10% by weight, preferably less than 5% by weight.

DESCRIPTION OF PREFERRED EMBODIMENTS

The composition of the invention comprises about 2% to 50% of a polyolefin polymer based on metallocene catalyst technology, about 5% to 50% of an APAO polyolefin polymer based on Ziegler-Natta catalyst technology, about 2% to 25% of an A-B-A type styrenic block copolymer, about 0% to 25% of an A-B type styrenic block copolymer, about 2% to 25% of a non-metallocene catalyzed ethylene based copolymer, about 10% to 50% of a tackifier, about 5% to 25% of a plasticizer, about 0% to 5% of an organosilane adhesion promoter, about 0% to 75% of an inorganic filler, about 0.1% to 3% of an antioxidant, about 0% to 3% additional UV and thermal stabilizers, and between 0% and 10% additional additives. All the percentages set forth in the present specification are percentages by weight.

The following specific example is given to further illustrate the invention.

|  | Patent Example 1 | Commercial Butyl Edge Seal |
|---|---|---|
| CAMEL-WITE | 32.55% |  |
| ESCOREZ 5415 | 18.0% |  |
| EASTOFLEX E1060 | 11.70% |  |
| SOLPRENE 1205 | 8.80% |  |
| VISTAMAXX 6202 | 9.10% |  |
| HYDROBRITE 550 | 11.10% |  |
| ATEVA 2604A | 4.50% |  |
| KRATON G-1657M | 3.25% |  |
| SILANE A187 | 0.45% |  |
| IRGANOX 1010 | 0.38% |  |
| TITANIUM DIOXIDE | 0.15% |  |
| CARBON BLACK | 0.02% |  |
| Tg (Rheology) | $-9°$ C. | $13°$ C. |
| G'@25° C. | $6.0 \times 10^6$ | $6.0 \times 10^6$ |
| G'@60° C. | $1.06 \times 10^6$ | $1.06 \times 10^6$ |
| G'@80° C. | $4.56 \times 10^5$ | $3.42 \times 10^5$ |
| ASTM F-1279 MVTR (gr/100 in 2/24 hr) | 0.07 | 0.12 |
| 50° C./500 g shear | 60 mins | 30 mins |
| 180° Glass Peel (PLI) | 45 | 40 |
| Harmonized IG Standards Testing |  |  |
| Initial Dew Point | <$-50°$ C. | <$-50°$ C. |
| 7 Day ASTM E-2189 Fogging | No Fog | No Fog |
| 14 Day High Humidity Test | <$-50°$ C. | <$-50°$ C. |
| 28 Day High Humidity Test | <$-50°$ C. | <$-50°$ C. |
| 63 Day Accelerated Weather Cycle | <$-50°$ C. | <$-50°$ C. |

The commercial butyl edge seal in the example above can be purchased from Bostik, Inc. under the product name Edgestik 5197.

Ingredient Listing

Camel-Wite is a 3.0 micron calcium carbonate available from Imerys Performance Minerals.

Escorez 5415 is a fully hydrogenated dicyclopentadiene resin with a Ring & Ball softening point of 115° C. and is available from ExxonMobil Chemical Co.

Eastoflex E1060 is a propylene-ethylene copolymer with a Ring & Ball softening point of 135° C. It is available from Eastman Chemical Co.

Solprene 1205 is a styrene/butadiene diblock polymer with a total styrene content of 25%. It is available from Dynasol Elastomers.

Vistamaxx 6202 is a propylene based elastomer made using metallocene catalyst technology available from ExxonMobil Chemical. It has a density of 0.861 g/cc. and a melt flow rate of 18 grams/10 minutes at 230° C./2.16 kg.

Hydrobrite 550 is a mineral oil available from Sonneborn, Inc.

Ateva 2604A is an ethylene/vinyl acetate copolymer with a vinyl acetate content of 26% and a melt index (190° C./2.16 kg) of 4.0 grams/10 minutes available from Celanese Corporation.

Kraton 1657M is a styrene/ethylene-butylene/styrene block copolymer with a 13 percent styrene content and a diblock content of 29 percent. It is available from Kraton Performance Polymers, LLC.

Silane A187 is an epoxy functional silane adhesion promoter available from Momentive Performance Materials.

Irganox 1010 is a hindered phenolic antioxidant available from BASF.

Melt flow or index (g/10 min) was determined by ASTM D-1238

Ring & Ball softening point (° C. or ° F.) was determined by ASTM E-28

Water vapor transmission rate (g/100 in$^2$/24 hrs) was determined by ASTM F-1279

Glass transition temperature (Tg) was determined by ASTM D-3418

Storage modulus (G')(dynes/cm$^2$) was determined by using a ARES rheometer which is available from TA Instruments. This was done by performing a temperature sweep from 160° C. to −40° C. at 10 radians per second on 25 millimeter parallel plates with a 1 percent strain.

We claim:

1. A hot melt sealant composition for use as an edge sealant in an insulated glass window unit, consisting essentially of:
   a. about 2% to 50% by weight of a polyolefin polymer which is made by metallocene catalyzed polymerization;
   b. about 5% to 50% by weight of an amorphous poly-alpha-olefin polymer;
   c. about 2% to 25% by weight of an A-B-A styrenic block copolymer;
   d. about 2% to 25% by weight of an non-metallocene catalyzed ethylene-based copolymer, said non-metallocene catalyzed ethylene-based copolymer comprising an ethylene vinyl acetate copolymer or terpolymer having a vinyl acetate content of 14% to 50% by weight and a melt index of less than 400 g/10 minutes;
   e. about 10% to 50% by weight of a tackifier;
   f. about 5% to 25% by weight of a plasticizer; and
   g. about 0.1% to 3% by weight of an antioxidant stabilizer.

2. The sealant composition of claim 1 wherein said polyolefin polymer is ethylene-based and selected from ethylene-propylene and ethylene-octene copolymers.

3. The sealant composition of claim 1 wherein said polyolefin polymer is a propylene-based copolymer.

4. The sealant composition of claim 3 wherein said propylene-based copolymer is a propylene-ethylene copolymer.

5. The sealant composition of claim 1 wherein said amorphous poly-alpha-olefin polymer is a propylene-based polymer selected from homopolymers of propylene or copolymers of propylene with one or more $C_2$ to $C_{10}$ alpha-olefin comonomers.

6. The sealant composition of claim 5 wherein said propylene-based polymer has a softening point between about 80° C. and 190° C., and a glass transition temperature from about −5° C. to −40° C.

7. The sealant composition of claim 1 wherein said A B A styrenic block copolymer is selected from styrene-isoprene-styrene (SIS), styrene-butadiene-styrene (SBS), styrene-ethylene-butylene-styrene (SEBS), styrene-ethylene-propylene-styrene (SEPS), styrene-ethylene-ethylene-propylene-styrene (SEEPS), styrene-isoprene-butadiene-styrene (SIBS), styrene-ethylene-butylene (SEB) and styrene-ethylene-propylene (SEP).

8. The sealant composition of claim 1 wherein said plasticizer is a mineral oil.

9. The sealant composition of claim 8 wherein said mineral oil has a flash point higher than 180° C.

10. The sealant composition of claim 1 further including an A-B styrenic block copolymer.

11. The sealant composition of claim 10 wherein said A B styrenic block copolymer is selected from styrene-butadiene (SB) and styrene-isoprene (SI) block copolymers.

12. The sealant composition of claim 1 further including an inorganic filler.

13. The sealant composition of claim 12 wherein said inorganic filler is calcium carbonate.

14. An insulated glass window unit having an edge sealant comprising a composition in accordance with claim 1.

* * * * *